(12) United States Patent
Shida et al.

(10) Patent No.: US 7,137,296 B2
(45) Date of Patent: Nov. 21, 2006

(54) TIRE AIR PRESSURE MONITORING SYSTEM

(75) Inventors: Naoki Shida, Zama (JP); Tetsurou Hirohama, Hiratsuka (JP)

(73) Assignee: Nissan Motor Co., Ltd., Yokohama (JP)

(*) Notice: Subject to any disclaimer, the term of this patent is extended or adjusted under 35 U.S.C. 154(b) by 14 days.

(21) Appl. No.: 11/171,253

(22) Filed: Jul. 1, 2005

(65) Prior Publication Data
US 2006/0001534 A1  Jan. 5, 2006

(30) Foreign Application Priority Data
Jul. 2, 2004  (JP) .............................. 2004-196401

(51) Int. Cl.
*G01M 17/02* (2006.01)
(52) U.S. Cl. ..................... 73/146.5; 340/447; 340/442
(58) Field of Classification Search ............... 73/146.5, 73/146; 340/442, 445, 447
See application file for complete search history.

(56) References Cited

U.S. PATENT DOCUMENTS 7,042,348 B1 * 5/2006 Schulze et al. ............. 340/447
2004/0090322 A1 * 5/2004 Tsujita ........................ 340/442
2005/0110623 A1 * 5/2005 Schulze et al. ............. 340/445
2005/0264405 A1 * 12/2005 Ueda .......................... 340/442

FOREIGN PATENT DOCUMENTS

EP    1110764 A2   6/2001
JP    11-334328 A  12/1999

* cited by examiner

*Primary Examiner*—Edward Lefkowitz
*Assistant Examiner*—Andre Allen
(74) *Attorney, Agent, or Firm*—Global IP Counselors

(57) ABSTRACT

A tire air pressure monitoring system includes a tire air pressure detecting device mounted to each tire of a vehicle having a transmitting section configured to wirelessly transmit necessary data including the tire air pressure data measured by a pressure detecting section at a prescribed interval, and an tire air pressure alarm control device that are mounted in the vehicle and configured to receive the wireless signal transmitted from the tire air pressure detecting device. A transmission control section of the tire air pressure detecting device is configured to initiate a generally continuous transmission at a continuous transmission interval that is shorter than the prescribed interval when the tire air pressure decreases by an amount equal to or greater than a prescribed amount within a prescribed time, and to terminate the generally continuous transmission when the tire air pressure alarm control device is capable of reception of the wireless signal.

16 Claims, 8 Drawing Sheets

TIRE AIR PRESSURE MONITORING SYSTEM

CROSS-REFERENCE TO RELATED APPLICATIONS

This application claims priority to Japanese Patent Application No. 2004-196401. The entire disclosure of Japanese Patent Application No. 2004-196401 is hereby incorporated herein by reference.

BACKGROUND OF THE INVENTION

1. Field of the Invention

The present invention generally relates to a tire air pressure monitoring system. More specifically, the present invention relates to a tire air pressure monitoring system in which a tire air pressure decrease alarm is issued when tire air pressure data wirelessly transmitted by a transmitting device coupled to each tire of a vehicle indicates a tire pressure is equal to or less than a prescribed pressure.

2. Background Information

Japanese Laid-Open Patent Publication No. 11-334328 discloses a conventional tire air pressure monitoring system, which has recently been used by vehicle manufacturers. Such conventional tire air pressure monitoring system is configured and arranged to measure the tire air pressure by a pressure sensor installed in each tire of a vehicle, to convert the measured values into digital data, and to wirelessly communicate the data with a receiving system installed in the vehicle by using a high frequency transmission circuit after performing AM modulation or FM modulation to the data. The conventional tire air pressure monitoring system manufactured in Japan usually uses a frequency of 315 MHz for transmitting the data between the tire air pressure sensor and the receiving system.

The radio broadcasting regulations in one country may be different from the radio broadcasting regulations in the other country. Thus, a maximum frequency legally allowed to be used in transmission in one country may be different from a maximum frequency allowed in another country. For example, radio broadcasting regulations enacted in North American allow for a higher maximum output value in radio waves than the maximum output value allowed under Japanese radio broadcasting regulations. Therefore, if the conventional tire air pressure monitoring system is installed in a vehicle manufactured in Japan for exporting to North America, then the conventional tire air pressure monitoring system would have an output value from the high frequency circuit that complies with the output value established under the radio broadcasting regulations of North America. However, operating such configured conventional tire air monitoring system in Japan would violate Japanese radio broadcasting regulations. Therefore, the vehicle manufactures usually suspend transmissions from the tire air pressure sensor (transmitter) after installing the tire air pressure monitoring system in the vehicle in Japan. Then, the vehicle is exported to North America. When the vehicle arrives in a pier or wharf of North America, or a dealer or retail service station in North America, the each tire air pressure sensor is started up by using special startup tools. Alternatively, the tire air pressure sensor is started by rapidly decreasing the tire air pressure by releasing the tire air pressure which is kept in a high pressure in transit during exportation. The tire air pressure sensor detects the rapid change in the tire air pressure, and starts up the system from a resting state to a normal state.

In view of the above, it will be apparent to those skilled in the art from this disclosure that there exists a need for an improved tire air pressure monitoring system. This invention addresses this need in the art as well as other needs, which will become apparent to those skilled in the art from this disclosure.

SUMMARY OF THE INVENTION

As explained above, in the conventional tire air pressure monitoring system, the rapid decrease in tire air pressure is detected which causes the tire air pressure monitoring system (or the transmitter of the tire air pressure monitoring system) to start up. However, if the tire air pressure rapidly changes when a receiver in the receiving system is not operating while an ignition switch of the vehicle is turned off, the receiver will not operate even when the transmitter starts up. This creates the danger that the receiver is temporarily unable to recognize the transmitter has been started up. In such case, the receiver determines the transmitter is in a sleep state, and a warning lamp is dimmed. As a result, the user, having seen the dimmed warning lamp, may misinterpret this as an abnormality in the tire pressure or a failure in the transmitter.

The present invention was designed in view of the problems described above. One object of the present invention is to provide a tire air pressure monitoring system that is configured and arranged to reliably prevent situations in which the receiver falsely determines the system is not working properly and sends a warning when the transmitter starts up from a state of suspended transmission.

In order to achieve the above object and other objects of the present invention, a tire air pressure monitoring system is provided that comprises a tire air pressure detecting device and a tire air pressure alarm control device. The tire air pressure detecting device is coupled to each tire of a vehicle, and includes a pressure detecting section, a transmitting section, and a transmission control section. The pressure detecting section is configured and arranged to detect a tire air pressure. The transmitting section is configured and arranged to transmit a wireless signal indicative of at least the tire air pressure detected by the pressure detecting section. The transmission control section is operatively coupled to the pressure detecting section and the transmitting section, and configured to selectively control transmission of the wireless signal from the transmitting section to selectively operate a rest mode, a normal mode in which the wireless signal is transmitted in at least a first prescribed interval, and a generally continuous transmission mode in which the wireless signal is transmitted in a continuous transmission interval that is shorter than the first prescribed interval. The tire air pressure alarm control device is coupled to the vehicle, and includes a receiving section and an alarm control section. The receiving section is configured and arranged to receive the wireless signal from the transmitting section of the tire air pressure detecting device. The alarm control section is configured to issue an alarm when the tire air pressure is equal to or less than a prescribed pressure. The transmission control section of the tire air pressure detecting device is further configured to shift from the rest mode to the generally continuous transmission mode upon determination of decrease in the tire air pressure by an amount equal to or greater than a prescribed amount within a prescribed period of time, and to shift from the generally continuous transmission mode to the normal mode upon determination of a continuous transmission termination condition that indicates the receiving section of the tire air pressure alarm control device can receive the wireless signal.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1 to 6, a tire air pressure monitoring system is illustrated in accordance with a first embodiment of the present invention.

Figure 1:
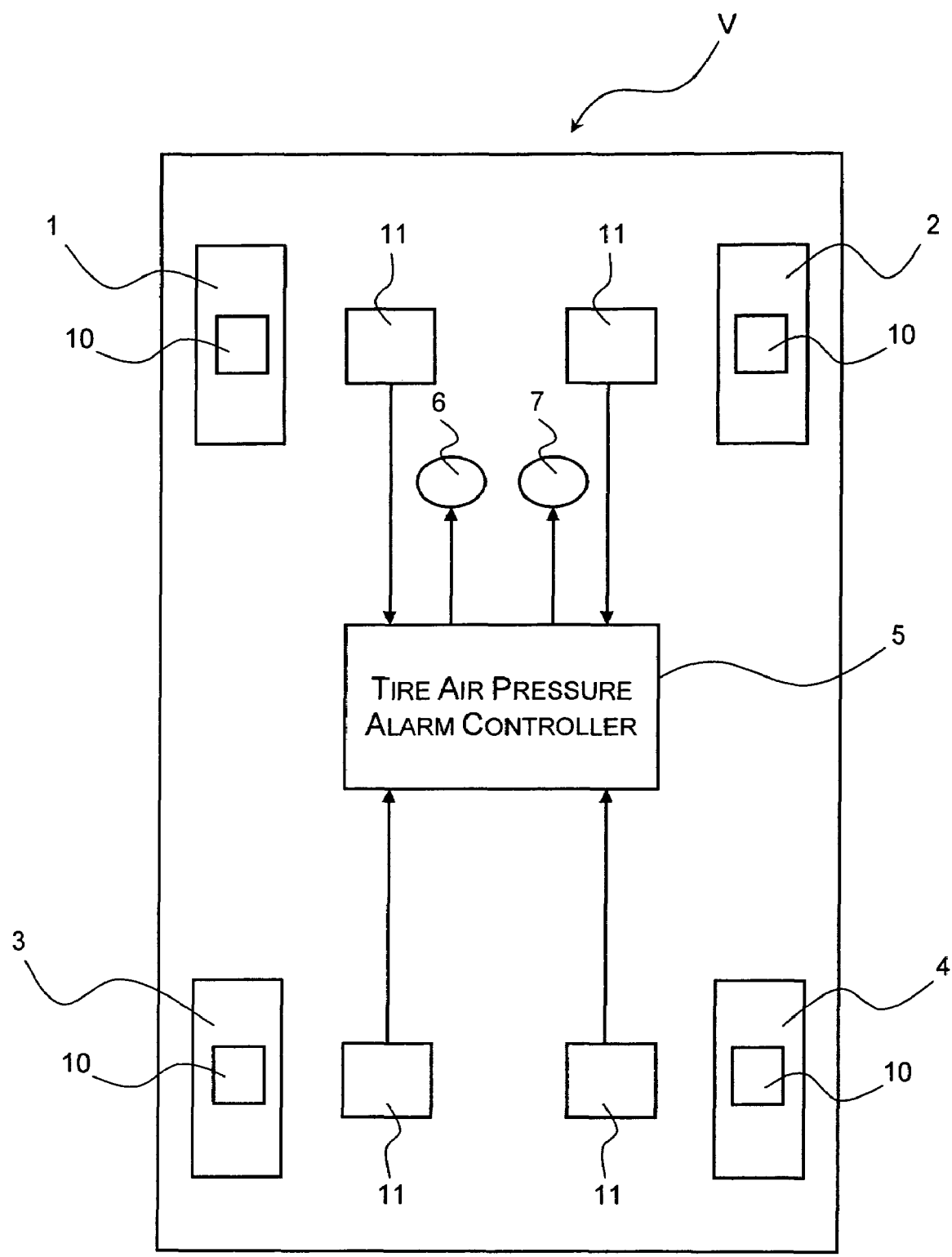
FIG. 1 is an overall diagram of a vehicle equipped with a tire air pressure monitoring system in accordance with a first embodiment of the present invention.

FIG. 1 is a diagrammatic overall view of a vehicle V in which the tire air pressure monitoring system in the first embodiment is applied. The vehicle V includes a left front wheel tire 1, a right front wheel tire 2, a left rear wheel tire 3 and a right rear wheel tire 4 as shown in FIG. 1. The tire air pressure monitoring system of the present invention basically comprises a plurality of tire air pressure sensors 10, a plurality of antenna-equipped tuner or receivers 11, a tire air pressure alarm controller 5, a display 6, and an air pressure decrease warning lamp 7. As seen in FIG. 1, the tire air pressure monitoring system is provided with four tire air pressure sensors 10 so that each of the tire air pressure sensors 10 is coupled to each one of the tires 1, 2, 3, and 4. Also, four antenna-equipped tuners 11 are preferably provided so that each of the antenna-equipped tuners 11 is configured and arranged to receive signals transmitted from corresponding one of the tire air pressure sensors 10. The tire air pressure sensor 10 preferably constitutes a tire air pressure detecting device of the present invention. The tire air pressure alarm controller 5 and the antenna-equipped tuners 11 preferably together constitute a tire air pressure alarm control device of the present invention as the antennal-equipped tuners 11 preferably constitute a receiving section and the tire air pressure alarm controller 5 preferably constitutes an alarm control section of the present invention.

More specifically, each of the tire air pressure sensors 10 is mounted to a road wheel 13 (shown in FIG. 3) of corresponding one of the front and rear wheel tires 1, 2, 3, and 4, and is configured and arranged to detect the tire air pressure in each tire separately. Each of the tire air pressure sensors 10 is also configured and arranged to transmit an individual ID (i.e., a tire identification code) and the detected pressure data (tire air pressure data) of the corresponding tire to the corresponding one of the antenna-equipped tuners 11 by a wireless signal.

Each of the antenna-equipped tuners 11 is configured and arranged to receive the information transmitted from the corresponding one of the tire air pressure sensors 10 and to input the information to the tire air pressure alarm controller 5.

The tire air pressure alarm controller 5 is configured to perform a separate ID registration for each tire, to display the tire air pressure information of the front and rear wheel tires 1, 2, 3, and 4 specified by the ID registration on the display 6. The tire air pressure alarm controller 5 is further configured to output a lamp lighting command to the air pressure decrease warning lamp 7 when at least one of the tire air pressures of the front and rear wheel tires 1, 2, 3, and 4 is determined to be equal to or less than a prescribed pressure. Of course, it will be apparent to those skilled in the art from this disclosure that the tire air pressure alarm controller 5 can be configured to issue the lamp lighting command when an amount of change in at least one of the tire air pressures of the front and rear wheel tires 1, 2, 3 and 4 becomes equal to or larger than a prescribed threshold value.

Figure 2:
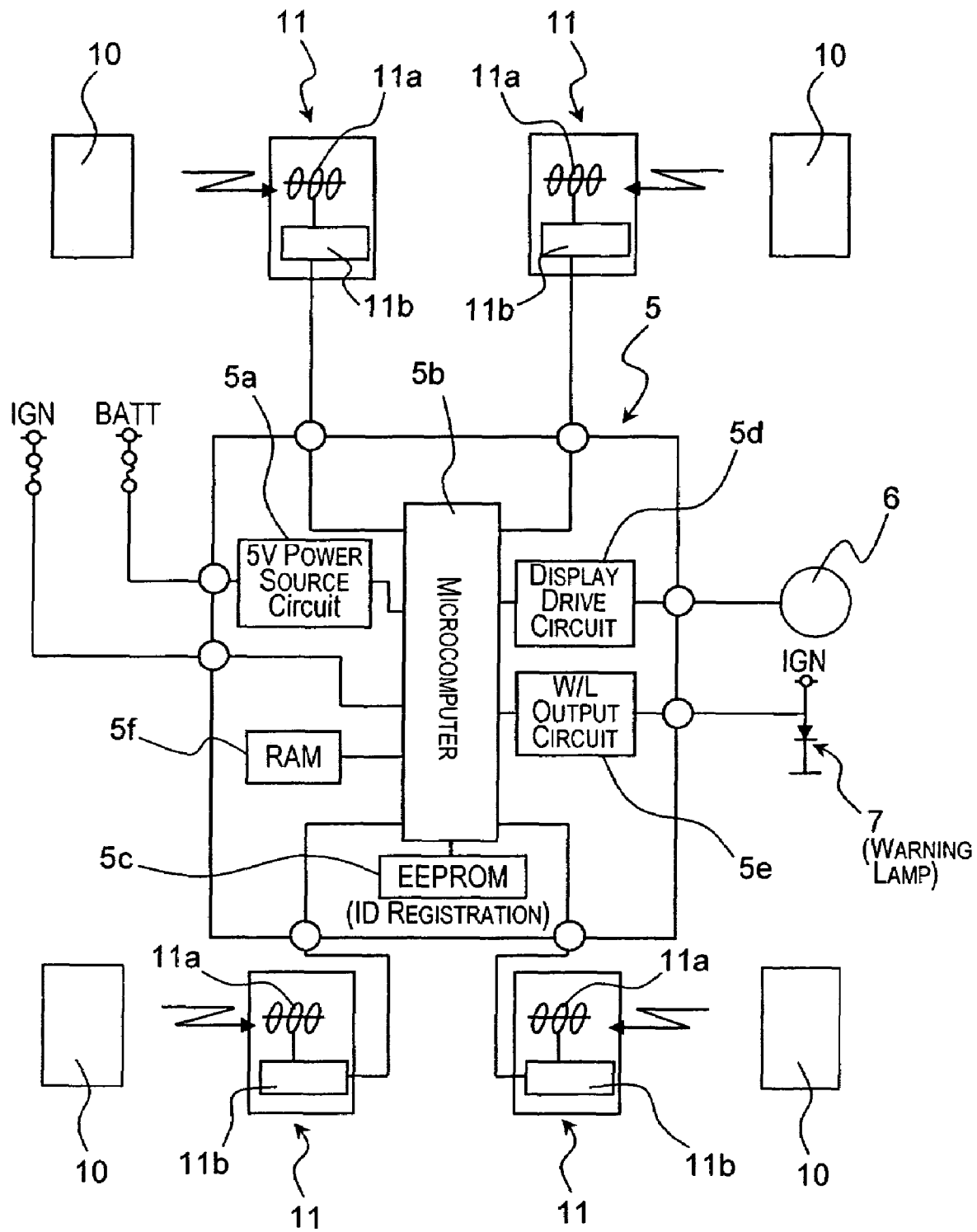
FIG. 2 is a block diagram of the tire air pressure monitoring system illustrated in FIG. 1 in accordance with the first embodiment of the present invention.

FIG. 2 is a schematic diagram showing the tire air pressure monitoring system in more detail in accordance with the first embodiment. As seen in FIG. 2, each of the antenna-equipped tuners 11 preferably comprises a receiving antenna 11a for receiving the transmitted data from the corresponding one of the tire air pressure sensors 10, and a tuner 11b that is configured and arranged as a receiving circuit. The data or information contained in one transmission from each of the tire air pressure sensors 10 preferably includes a start bit, a function code, an ID, pressure data, a check sum, and other such information.

As shown in FIG. 2, the tire air pressure alarm controller 5 preferably includes a 5V power source circuit 5a, a microcomputer 5b, an EEPROM (Electronically Erasable and Programmable Read Only Memory) 5c, a display drive circuit 5d, a warning lamp output circuit 5e, and a RAM (Random Access Memory) 5f. The microcomputer 5b of the tire air pressure alarm controller 5 is configured to input the received data from the tuners 11b of the antenna-equipped tuners 11 and perform various types of information processing. The EEPROM 5c is a memory capable of electrically erasing the stored information for ID registration. The display drive circuit 5d is configured and arranged to output a display drive command for displaying tire air pressure information for the tires 1, 2, 3, and 4 to the display 6 based on the received data. The warning lamp output circuit 5e is configured and arranged to determine the pressure value of the tires 1, 2, 3 and 4 that are mounted to the vehicle V from the received data and output a tire air pressure warning command to the air pressure decrease warning lamp 7 when at least one of the pressures of the tires 1, 2, 3 and 4 has decreased. The RAM 5f is configured and arranged to temporarily store the ID registration process information.

Of course, it will be apparent to those skilled in the art from this disclosure that the tire air pressure alarm controller 5 can also include other conventional components such as an input interface circuit and an output interface circuit. The tire air pressure alarm controller 5 is operatively coupled to the various components of the tire air pressure monitoring system in a conventional manner. The tire air pressure alarm controller 5 is capable of selectively controlling any of the components of the control system of the tire air pressure warning controller 5 in accordance with the control program. It will be apparent to those skilled in the art from this disclosure that the precise structure and algorithms for the tire air pressure alarm controller 5 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 3:
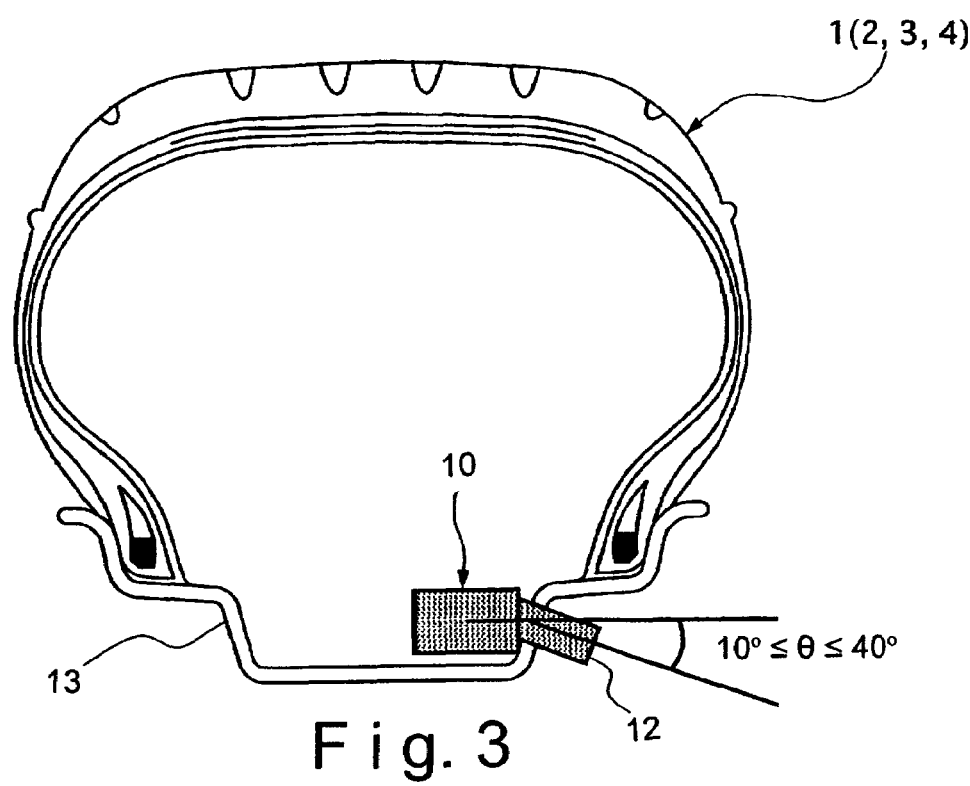
FIG. 3 is a diagrammatic cross sectional view of a tire of the vehicle illustrating a mounting arrangement of a tire air pressure sensor of the tire air pressure monitoring system in accordance with the first embodiment of the present invention.

FIG. 3 is a diagrammatic cross sectional view of the tire 1 showing a state in which the tire air pressure sensor 10 is mounted to the tire 1 in accordance with the first embodiment of the present invention. It will be apparent to those skilled in the art from this disclosure that the mounting arrangement of the tire air pressure sensor 10 to the tire 2, 3, or 4 is basically identical to the arrangement illustrated in FIG. 3 except for the left and right tires (tires 1 and 2 or tires 3 and 4) may be arranged as mirror images of each other.

As seen in FIG. 3, the tire air pressure sensor 10 is coupled to a back side end portion of a valve 12 provided in the road wheel 13 to which the tire 1 is mounted for allowing air to flow through when the tire 1 is inflated or deflated. The tire air pressure sensor 10 is disposed inside an air chamber of the tire 1 as shown in FIG. 3. Moreover, the tire air pressure sensor 10 and the valve 12 are preferably arranged in an angle θ (e.g., $10° \leq θ \leq 40°$) with respect to each other as shown in FIG. 3.

Figure 4:
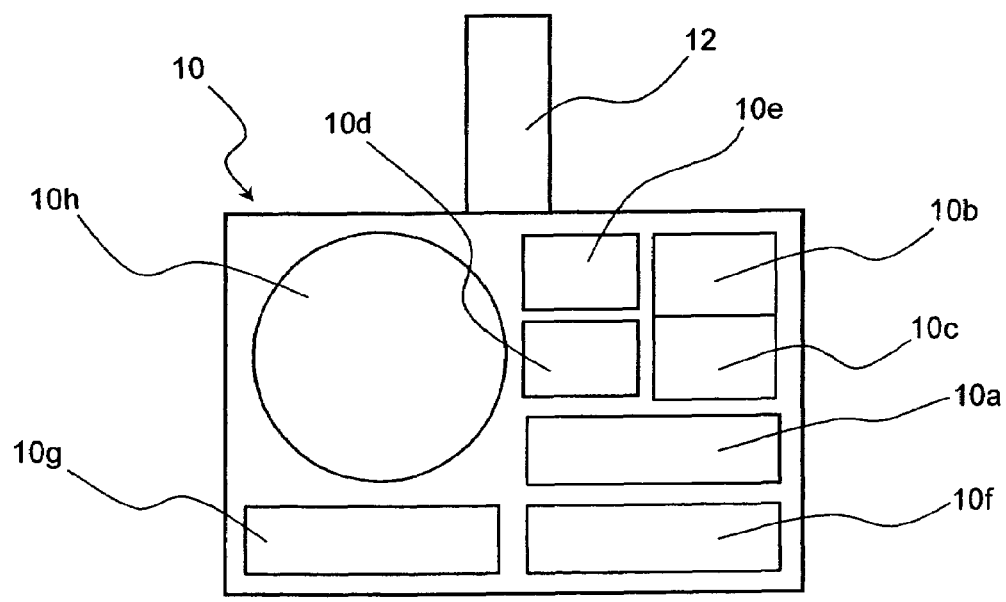
FIG. 4 is a simplified diagrammatic view of the tire air pressure sensor of the tire air pressure monitoring system in accordance with the first embodiment of the present invention.

FIG. 4 is a simplified diagrammatic view of the tire air pressure sensor 10 in accordance with the first embodiment of the present invention. As seen in FIG. 4, the tire air pressure sensor 10 preferably comprises a pressure sensor 10a, an acceleration sensor 10b, a roll switch 10c, an ASIC (application specific integrated circuit) 10d, a high frequency transmission circuit 10e, an antenna 10f, a temperature sensor 10g and a battery 10h. The pressure sensor 10a is configured and arranged to detect tire air pressure. The acceleration sensor 10b is configured and arranged to detect acceleration due to the centrifugal force imparted thereon. The roll switch 10c is configured and arranged to open (OFF) when the acceleration imparted to the tire is low (i.e., a region of speed where the centrifugal force imparted to the tire is low) and to close (ON) when the acceleration is high (i.e., a region of speed where the centrifugal force imparted to the tire is high). The ASIC 10d is configured to control the transmission of the wireless signal from the tire air pressure sensor 10 to the antenna-equipped tuner 11. The high frequency transmission circuit 10e and the antenna 10f preferably constitute a transmitter or transmitting section of the tire air pressure sensor 10.

The ASIC 10d is configured and arranged to selectively choose one of a plurality of prescribed transmission intervals for transmitting the wireless signal from the transmitter depending on the vehicle operating condition and other considerations. More specifically, when the tire air pressure monitoring system is in a normal mode (i.e., during regular periodic transmission), the ASIC 10d is configured to select one of first and second transmission intervals triggered by the opening and closing of the roll switch 10c provided to ensure the longevity of the battery 10h. The first transmission interval is set to a relatively short interval (e.g., one minute) to be used in a region with a high vehicle speed when the roll switch 10c is ON, and the second transmission interval is set to a relatively long interval (e.g., one hour) to be used in a region with a low vehicle speed including a vehicle stopping state when the roll switch 10c is OFF. When the tire air pressure monitoring system is in a rest mode such as when the vehicle V is in transit for exportation, the ASIC 10d is preferably configured to set a transmission interval that is substantially longer than the second transmission interval. If there is a rapid change in the tire pressure when the tire air pressure monitoring system is in the rest mode, the ASIC 10d is configured to shift from the rest mode to a continuous transmission mode to perform a generally continuous transmission of the wireless signals in which the wireless signal is transmitted in a prescribed continuous transmission interval. The generally continuous transmission mode will be explained in more detail below.

More specifically, in the first embodiment of the present invention, the ASIC 10d is preferably configured to suspend the transmission of the signal from the tire air pressure sensor 10 when the tire air pressure sensor 10 is in the rest mode. In other words, in the first embodiment of the present invention, the rest mode is preferably a transmission suspension mode in which no signal is transmitted. However, the rest mode in the present invention can be set so that a signal is transmitted as a prescribed interval which is preferably substantially greater than the first or second prescribed interval used in the normal mode but could be equal to the first or second prescribed interval used in the normal mode.

Generally Continuous Transmission

Figure 5:
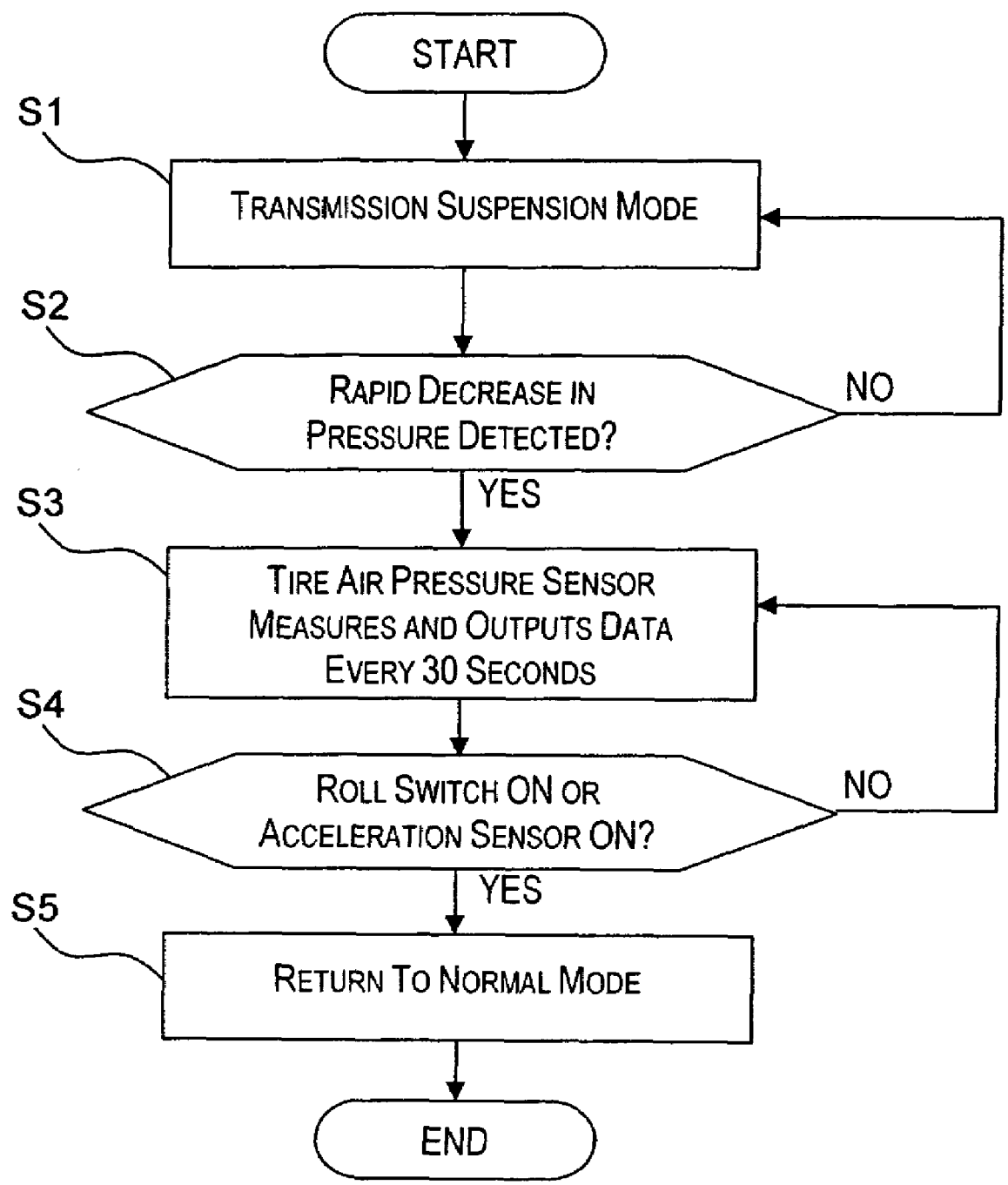
FIG. 5 is a flowchart describing a control process executed in an ASIC of the tire air pressure sensor of the tire air pressure monitoring system for executing a generally continuous transmission in accordance with the first embodiment of the present invention.

Referring now to FIG. 5, the operation of the present invention will be explained. FIG. 5 is a flowchart describing a control flow executed in the ASIC 10d of each of the tire air pressure sensors 10 for executing the generally continuous transmission in accordance with the first embodiment.

Prior to conducting the generally continuous transmission, the ASIC 10d is configured to first temporarily place the transmitter (the high frequency transmission circuit 10e and the antenna 10f) in the rest mode. More specifically, in the first embodiment, the ASIC 10d is configured to suspend transmission of the wireless data from the antenna 10f of the tire air pressure sensor 10 after the tire air pressure monitoring system is installed in the vehicle V in a factory in a first country (e.g., Japan) up until the exportation to a second country (e.g., a country in North America) is complete in order to avoid violating the radio broadcasting regulations of the originating first country.

Therefore, in step S1 of FIG. 5, the ASIC 10d is configured to suspend transmission from the transmitter (i.e., the high frequency transmission circuit 10e and the antenna 10f) of the tire air pressure sensor 10 (the transmission suspension mode). Then, the process advances to step S2.

In step S2, the ASIC 10d is configured to determine whether a rapid decrease in pressure occurred in the tire air pressure by an amount that is equal to or greater than a prescribed amount (e.g., 8.3 kPa) within a prescribed amount of time. The prescribed amount of time can be preset to an amount of time required to reduce the tire air pressure by 8.5 kPa during a tire air release operation (e.g., 30 seconds). If the rapid decrease in pressure is detected in step S2 (Yes in step S2), the process advances to step S3. Otherwise, the process returns to step S1.

In step S3, upon detection of the rapid decrease in the tire air pressure in step S2, the ASIC 10d is configured to shift from the transmission suspension mode to the generally continuous transmission mode in which the generally continuous transmission of the wireless data is executed. More specifically, in the generally continuous transmission, the pressure sensor 10a of the tire air pressure sensor 10 is configured and arranged to measure the tire air pressure in the prescribed continuous transmission interval, and the transmitter (i.e., the high frequency transmission circuit 10e and the antenna 10f) of the tire air pressure sensor 10 is configured to transmit the wireless signal containing the necessary data (including the tire air pressure data) in the prescribed continuous transmission interval. In the first embodiment of the present invention, the prescribed continuous transmission interval is preferably set to 30 seconds. Then, the process advances to step S4, and the generally continuous transmission is maintained until a continuous transmission termination condition in next step S4 is achieved.

In step S4, the ASIC 10d is configured to determine whether the roll switch 10c is ON and whether the acceleration sensor 10b is ON. As mentioned above, the ON state of the roll switch 10c or the ON state of the acceleration sensor 10b indicates the vehicle V is traveling at a speed equal to or greater than a prescribed speed. If at least one of the roll switch 10c and the acceleration sensor 10b is ON (Yes in step S4), the process advances to step S5. Otherwise (No in step S4), the process returns to step S3. This step S4 preferably constitutes a traveling state detecting section of the present invention. Moreover, in the first embodiment of the present invention, the roll switch ON or the acceleration switch ON satisfies the generally continuous transmission termination condition.

In step S5, upon determination of the vehicle V being traveling at a speed equal to or greater than the prescribed speed in step S4, the ASIC 10d is configured to shift from the generally continuous transmission mode (e.g., one transmission in every 30 seconds) to the normal mode with periodic transmission at regular intervals (e.g., one transmission in every one minute while the vehicle V is traveling, and one transmission in every one hour while the vehicle V is stopped or traveling at very low speed). Then, the ASIC 10d is configured to end this cycle of the control process.

Transmission Suspension Mode to Generally Continuous Transmission Mode

Figure 6:
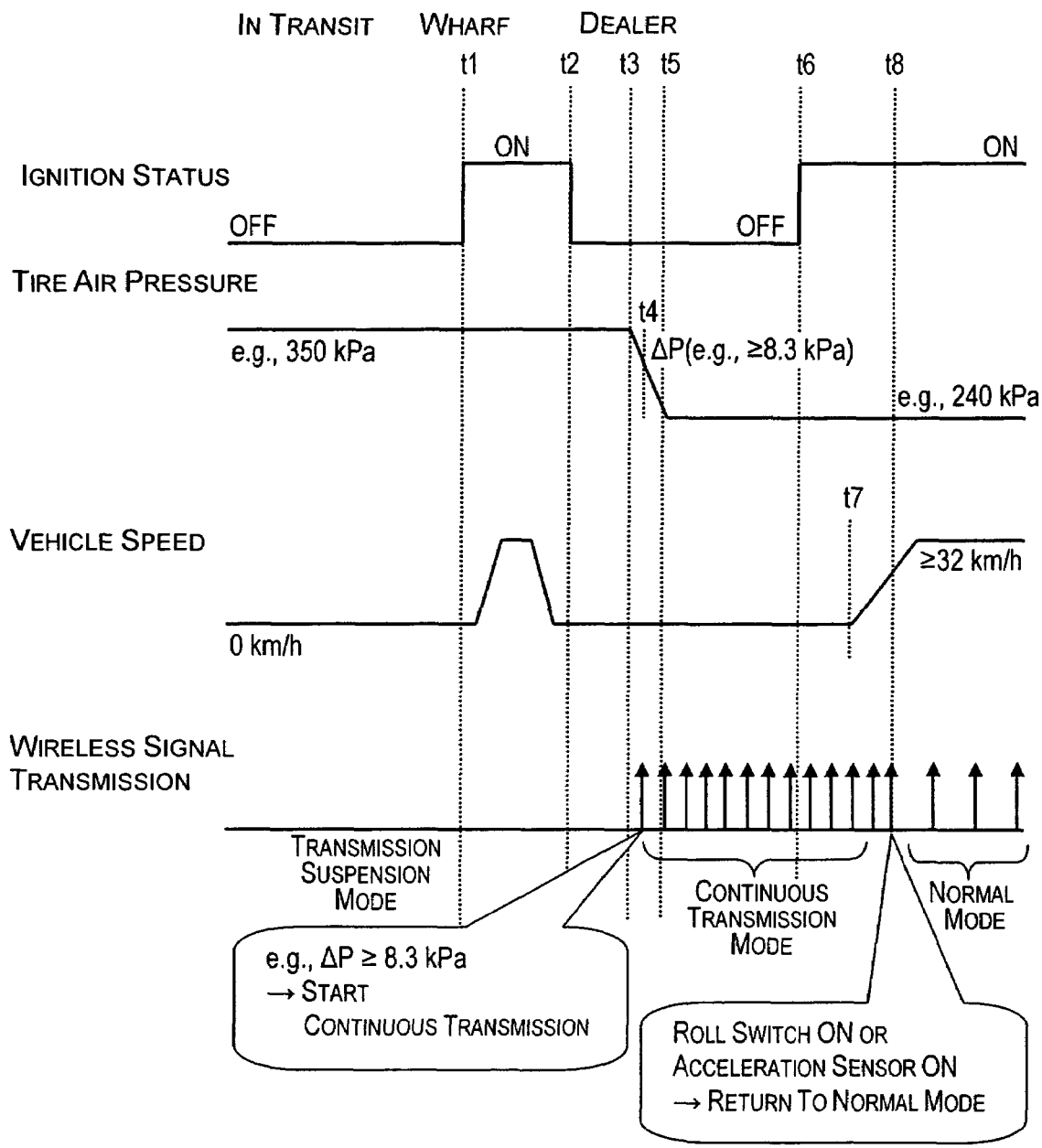
FIG. 6 is a time chart for illustrating an example of changes in ignition status, tire air pressure, vehicle speed and transmission from the tire air pressure sensor when the vehicle changes from a transmission suspension mode to a normal mode via a continuous transmission mode in accordance with the first embodiment of the present invention.

Referring now to the time chart of FIG. 6, one example of relationships among the ignition switch, the tire air pressure of the tire 1, 2, 3 or 4, the vehicle speed, and the transmission of the wireless signals with respect to time are explained in accordance with the first embodiment of the preset invention.

As previously described above in the background of the invention, wireless transmission with an output in compliance with radio broadcasting regulation of one country (e.g., a country in North American) may not be permissible in another country (e.g., Japan). Therefore, if the tire air pressure monitoring system is installed in the vehicle V in a first country (e.g., Japan), and the vehicle V is exported from the first country to a second country (e.g., a country in North America), the transmitters of the tire air pressure sensors 10 need to be suspended (i.e., transmission suspension mode) in a factory in the first country, during exportation until time t1 when the vehicle V reaches a wharf of the second country as shown in the time chart in FIG. 6. When the vehicle V is in-transit during exportation (prior to time t1), the ignition switch of the vehicle V is turned off. Also, when the vehicle V is in transit during exportation, the tire air pressure in each tire 1, 2, 3 or 4 of the vehicle V is preferably held at a high pressure for transit (e.g., 350 kPa) than a normal pressure (e.g., 240 kPa).

When the vehicle V has reached the wharf of the second country at time t1 and is driven and transported to a retailer or dealer, the ignition switch is turned on and the vehicle V is driven at a certain speed, as shown in the time chart in FIG. 6, until the vehicle V arrives at the dealer at time t2. Even in time t2, since the tire air pressure of each tire 1, 2, 3 or 4 is held at the high pressure for transit, a condition in step S2 in the flowchart in FIG. 5 is not satisfied. Thus, the transmission of the wireless signals is still suspended.

Next, in the dealer, the high tire air pressure (e.g., 350 kPa) is released so that the tire air pressure reaches a stable, normal pressure (e.g., 240 kPa). This operation of reducing the tire air pressure is initiated at time t3 in FIG. 6. The condition in step S2 in the flowchart in FIG. 5 is achieved when a change (decrease) in tire air pressure ΔP is equal to or greater than a prescribed amount (e.g., 8.3 kPa) at time t4. Then, the process advances to step S3 in FIG. 5 where the ASIC 10d is configured to start the generally continuous transmission every 30 seconds. A suitable tire air pressure (e.g., 240 kPa) is reached at time t5, and adjustment of the tire air pressure by release of air pressure is complete.

The generally continuous transmission in which the wireless signal is transmitted every 30 seconds is maintained even after time t6 at which the ignition switch of the vehicle V is turned from OFF to ON and after time t7 at which the vehicle V begins to move. If the vehicle speed reaches a prescribed speed (e.g., 32 km/h) or more at time t8 after the vehicle V is started, the roll switch 10c and/or the acceleration sensor 10b of each of the tire air pressure sensors 10 are turned on. At this point (time t8), the generally continuous transmission termination condition is satisfied in accordance with the first embodiment. Therefore, in the flowchart in FIG. 5, the process advances from step S4 to step S5, the generally continuous transmission mode in which the wireless signal is transmitted every 30 seconds is terminated, and the system advances to the normal mode as seen in FIG. 6.

As described above, when the vehicle has arrived at the wharf of the second country (e.g., a country in North America) and the tire air pressure of each of the tire 1, 2, 3 and 4 has been rapidly reduced by a prescribed amount, the transmitter (the high frequency transmission circuit 10e and the antenna 10f) of each of the tire air pressure sensors 10 is configured to automatically start transmitting measured value of the tire air pressure at a prescribed short time interval (e.g., 30 seconds), and the generally continuous transmission mode for transmitting wireless data is started. The generally continuous transmission mode is required to be continued until the antenna-equipped tuners 11 reach a reception enabled state, in which the antenna-equipped tuners 11 can receive the wireless signals sent by the corresponding one of the tire air pressure sensors 10. If the generally continuous transmission mode is ended when the antenna-equipped tuners 11 are not in the reception enabled state, in some cases, transmitted data is not received by the antenna-equipped tuners 11 for a long time, and there is a possibility that the tire air pressure monitoring system falsely determines the system is not operating regularly. Since each of the tire air pressure sensors 10 in the first embodiment does not have a function of receiving a status of the antenna-equipped tuner 11 (i.e., the receiver) indicating whether the receiver is ON or OFF based on the status of the ignition switch, the receiver ON state cannot be determined in the tire air pressure sensor 10 based on the ignition switch state. Therefore, in the first embodiment of the present invention, the ASIC 10d of the tire air pressure sensor 10 is configured and arranged to assume the ignition switch is ON and the receiver is turned on when the vehicle V has begun to move. Therefore, the vehicle traveling state in which the vehicle V is traveling at a speed equal to or greater than the prescribed speed is independently determined based on the detection result of the acceleration sensor 10b or the roll switch 10c without actually detecting the status of the ignition switch. Thus, in the present invention the existing components such as the acceleration sensor 10b and the roll switch 10c provided in the tire air pressure sensor 10 can be used to determine the generally continuous transmission termination condition. The tire air pressure monitoring system then advances to the normal transmission mode after it is determined that the vehicle V is traveling.

Accordingly, with the tire air pressure monitoring system of the first embodiment, when the ignition switch is turned on (while the receiver is operating), the receiver can automatically determine the transmitter has been turned on. Moreover, since the transmitter starts up only when the rapid decrease in tire air pressure occurred when the tire air pressure monitoring system is in the transmission suspension mode, the transmitter does not automatically start up when the tires are inflated in the factory (air is automatically pumped into the tires). Thus, the possibility of erroneous ID registration in the factory in the first country (e.g., Japan) can be prevented.

Accordingly, in the tire air pressure monitoring system in first embodiment, the effects explained below can be obtained.

(1) The tire air pressure monitoring system of the present invention comprises a plurality of tire air pressure sensors 10 coupled to the tires 1, 2, 3 and 4, respectively. Each of the tire air pressure sensors 10 includes the transmitter or the transmitting section (i.e., the high frequency transmission circuit 10e and the antenna 10f) that is configured and arranged to wirelessly transmit the necessary data, including the tire air pressure data measured by the pressure sensor 10a at prescribed time intervals. The tire air pressure monitoring controller 5 is mounted in the vehicle V that is coupled to the antenna-equipped tuners 11 for receiving the wireless signals transmitted from the corresponding tire air pressure sensors 10. The tire air pressure monitoring controller 5 is configured to send out a tire air pressure decrease warning when at least one of the wirelessly inputted pieces of tire air pressure data indicates that the tire air pressure is equal to or lower than the prescribed pressure. The ASIC 10d of the tire air pressure sensor 10 is configured to perform the generally continuous transmission from the transmitter of the tire air pressure sensor 10 to transmit necessary data through the wireless signal at the generally continuous transmission interval set to be shorter than the prescribed time intervals used in the normal mode when the tire air pressure is determined by the pressure sensor 10a to have decreased by an amount equal to or greater than a prescribed amount within a prescribed time. The ASIC 10d is also configured and arranged to terminate the generally continuous transmission when the antenna-equipped tuners 11 are confirmed to be capable of reception of the wireless signals. Therefore, it is possible to reliably avoid situations in which the receiver erroneously determines the transmitter is in a sleep state and issues a warning after the transmitter is started up from the transmission suspension mode.

(2) Each of the tire air pressure sensors 10 is provided with the traveling state detecting section (e.g., the acceleration sensor 10b and/or the roll switch 10c) configured and arranged to determine whether the vehicle V is traveling at a speed equal to or greater than the prescribed speed. The ASIC 10d is configured to terminate the generally continuous transmission when the traveling state detecting section determines that the vehicle V is traveling at a speed equal to or greater than the prescribed speed. It is therefore possible to accurately determine whether the receivers (e.g., the antenna-equipped tuners 11 and the tire air pressure alarm controller 5) are in the reception-enabled state merely by providing the traveling state detecting section to each of the tire air pressure sensors 10 that is merely a transmitter in the first embodiment of the present invention.

(3) Since the traveling state detecting section comprises the acceleration sensor 10b and the roll switch 10c that are used to determine the transmission intervals in the normal mode with regular transmission cycle based on the magnitude of centrifugal force, it is possible to accurately determine whether the receiver is in the reception-enabled state without increasing costs by using existing detection devices provided in the tire air pressure sensor 10.

Accordingly, in the tire air pressure monitoring system according to the present invention, the generally continuous transmission of the necessary data is initiated in the tire air pressure sensor 10 when the tire air pressure is detected by the pressure sensor 10a to have decreased by an amount that is equal to or greater than the prescribed amount within a prescribed time. The generally continuous transmission is terminated when the receiver is determined to be capable of reception of the wireless signals. Consequently, when the transmitter starts up as a result of a rapid decrease in tire air pressure, the generally continuous transmission of tire air pressure data continues thereafter. Therefore, the situations in which the receiver in OFF state cannot temporary detects that the transmitter has started up can be avoided. As a result, it is possible to reliably prevent situations in which the receiver provides an erroneous determination of system malfunction and issue a warning when the transmitter is started up from the transmission suspension mode.

SECOND EMBODIMENT

Figure 7:
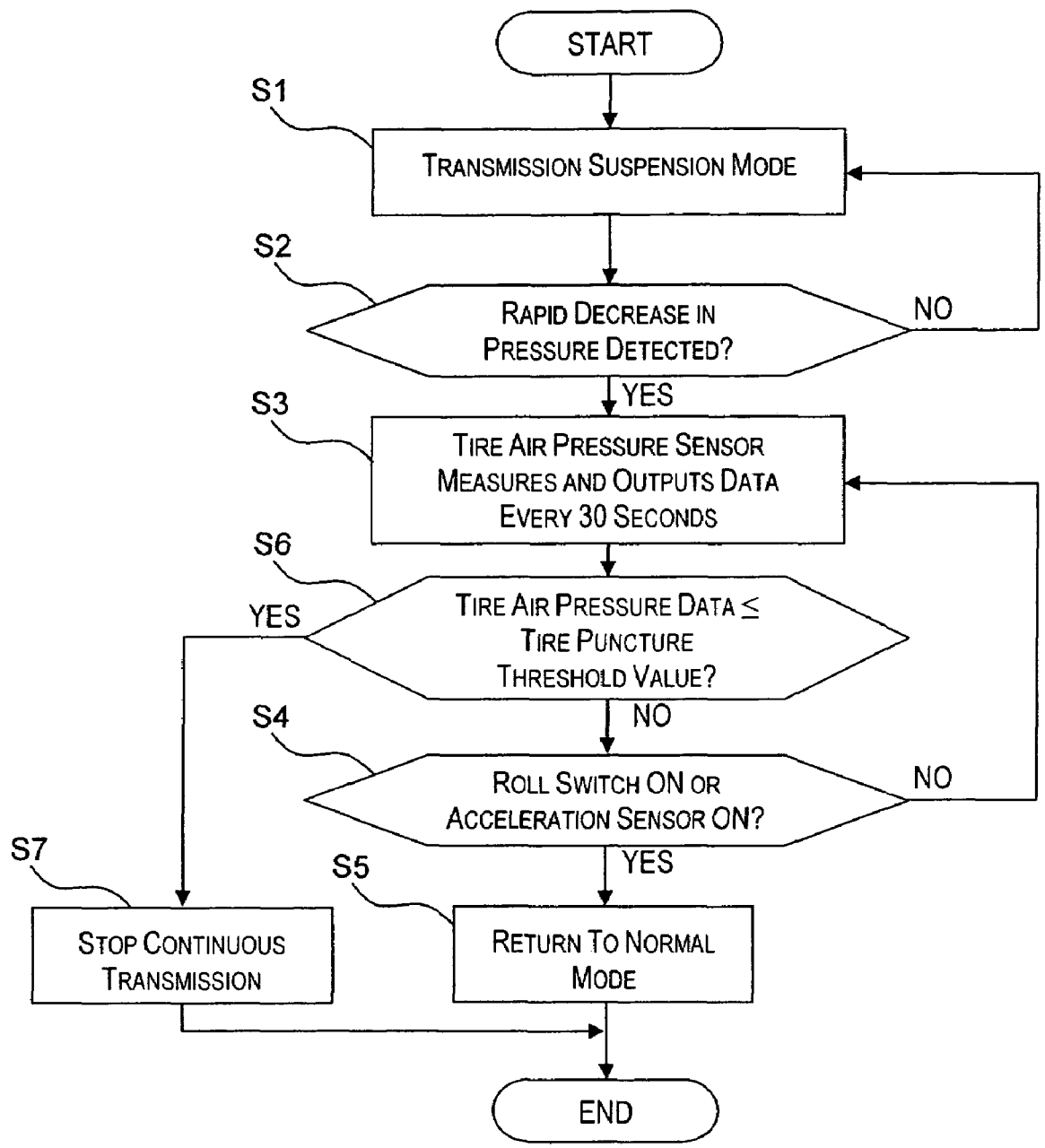
FIG. 7 is a flowchart describing a control process executed in an ASIC of a tire air pressure sensor of a tire air pressure monitoring system for executing a generally continuous transmission in accordance with a second embodiment of the present invention.

Referring now to FIG. 7, a tire air pressure monitoring system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The tire air pressure monitoring system of the second embodiment is basically identical to the tire air pressure monitoring system of the first embodiment except for the ASIC 10*d* of the tire air pressure sensor 10 is configured to execute a control process shown in the flowchart of FIG. 7 instead of the flowchart of FIG. 5. More specifically, in the second embodiment, the ASIC 10*d* of the tire air pressure sensor 10 is configured to stop the generally continuous transmission of the tire air pressure data when the tire air pressure data indicates the tire air pressure is equal to or less than a tire puncture threshold value. Thus, with the tire air pressure monitoring system of the second embodiment, the generally continuous transmission is stopped when the tire air pressure has decreased due to a tire puncture or the like before the vehicle V arrives at the destination country and the tire air pressure is released to the normal pressure. The structure of the tire air pressure monitoring system in the second embodiment is basically identical to that of the first embodiment illustrated in FIGS. 1 to 4. Therefore, the descriptions thereof are therefore omitted.

Referring to a flowchart shown in FIG. 7, a control process executed in the ASIC 10*d* of each of the tire air pressure sensors 10 for executing the generally continuous transmission in accordance with the second embodiment will be explained. In FIG. 7, steps S1 through S5 are identical to steps S1 through S5 shown in FIG. 5, and descriptions thereof are therefore omitted.

In step S6 of FIG. 7, after the generally continuous transmission has been initiated in step S3, the ASIC 10*d* is configured to determine whether the tire air pressure data measured by the pressure sensor 10*a* indicates the tire air pressure is equal to or less than a prescribed tire puncture threshold value. If the ASIC 10*d* determines the tire air pressure date indicates the tire air pressure is equal to or less than the prescribed tire puncture threshold value (Yes in step S6), the process advances to step S7. Otherwise (No in step S6), the process advances to step S4. Step S6 preferably constitutes a tire puncture detecting section.

In step S7, when the tire air pressure in step S6 is less than or equal to the tire puncture threshold value (i.e., the tire is assumed to have punctured), the ASIC 10*d* is configured to stop the generally continuous transmission of the necessary data. Then the ASIC 10*d* is configured to end the control process of this cycle.

Continuous Transmission Malfunction Due to Tire Puncture

When the tire air pressure rapidly decreases due to tire puncture or the like when the tire air pressure monitoring system is in the transmission suspension mode while the vehicle V is transported from the factory to a domestic wharf for exportation, or in other similar situations, the process may advance from step S1 to step S2, and to step S3 in the flowchart in FIG. 7, and the generally continuous transmission of the necessary data every 30 seconds may be erroneously initiated. In such case, the generally continuous transmission must be immediately suspended because such transmission may violate the domestic radio broadcasting regulations.

When the tire air pressure is reduced due to the tire puncture or the like, the level of reduction of the tire air pressure exceeds the suitably adjusted level of tire air pressure. Therefore, the tire puncture threshold value is preferably set in advance, and when the tire air pressure is less than or equal to the tire puncture threshold value, the process advances in the order of step S1→step S2→step S3→step S6→step S7 in the flowchart in FIG. 7, and the generally continuous transmission is suspended as a result.

Accordingly, with the tire air pressure monitoring system of the second embodiment, the following effects can be obtained in addition to the effects (1) through (3) of the first embodiment.

(4) The tire puncture determination step S6 is provided for determining whether the tire air pressure measured by the pressure sensor 10*a* is equal to or less than the tire puncture threshold value, and the generally continuous transmission suspension step S7 is provided for suspending the generally continuous transmission when the tire puncture has been determined to occur by the tire puncture determination step S6 in the generally continuous transmission mode. Therefore, when the generally continuous transmission is erroneously initiated as a result of the tire air pressure rapidly decreasing due to the tire puncture and the like when the vehicle V is being transported within the originating country with the tire air pressure monitoring system being in the transmission suspension mode, it is possible to immediately suspend the generally continuous transmission erroneously initiated by the rapid decrease in pressure due to the tire puncture or the like.

THIRD EMBODIMENT

Figure 8:
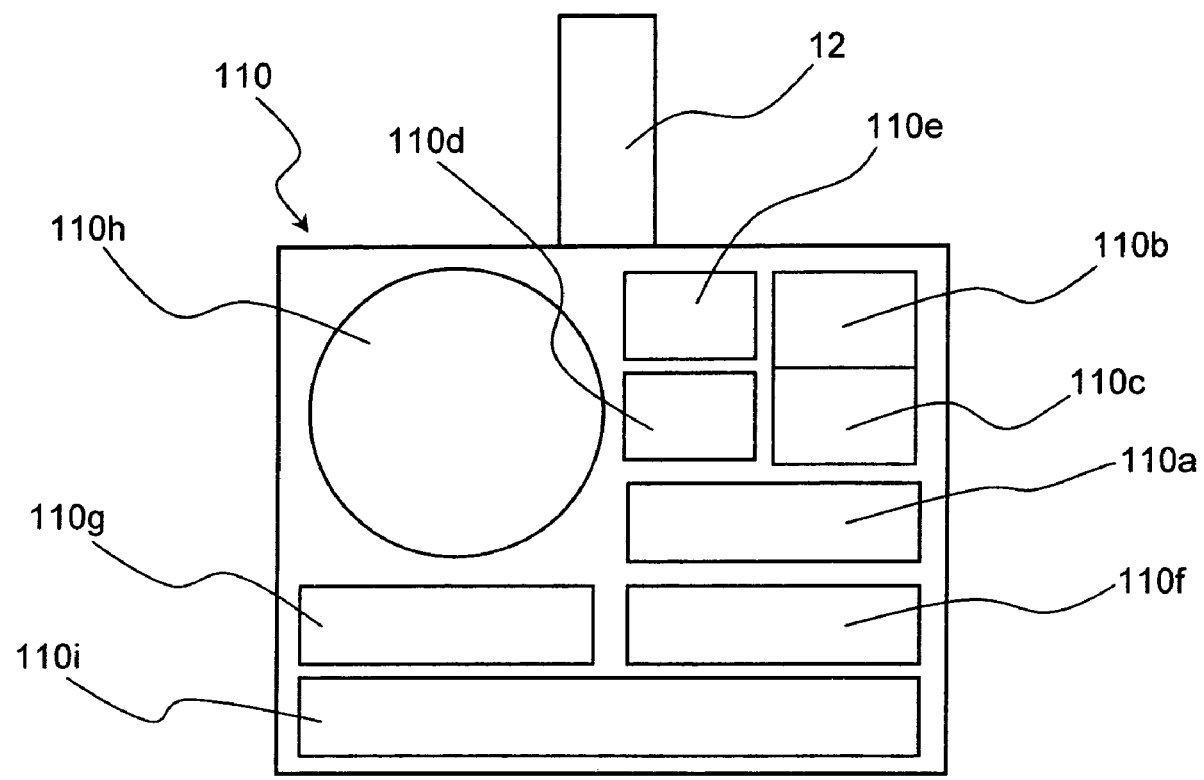
FIG. 8 is a simplified diagrammatic view of a tire air pressure sensor of a tire air pressure monitoring system in accordance with a third embodiment of the present invention.
Figure 9:
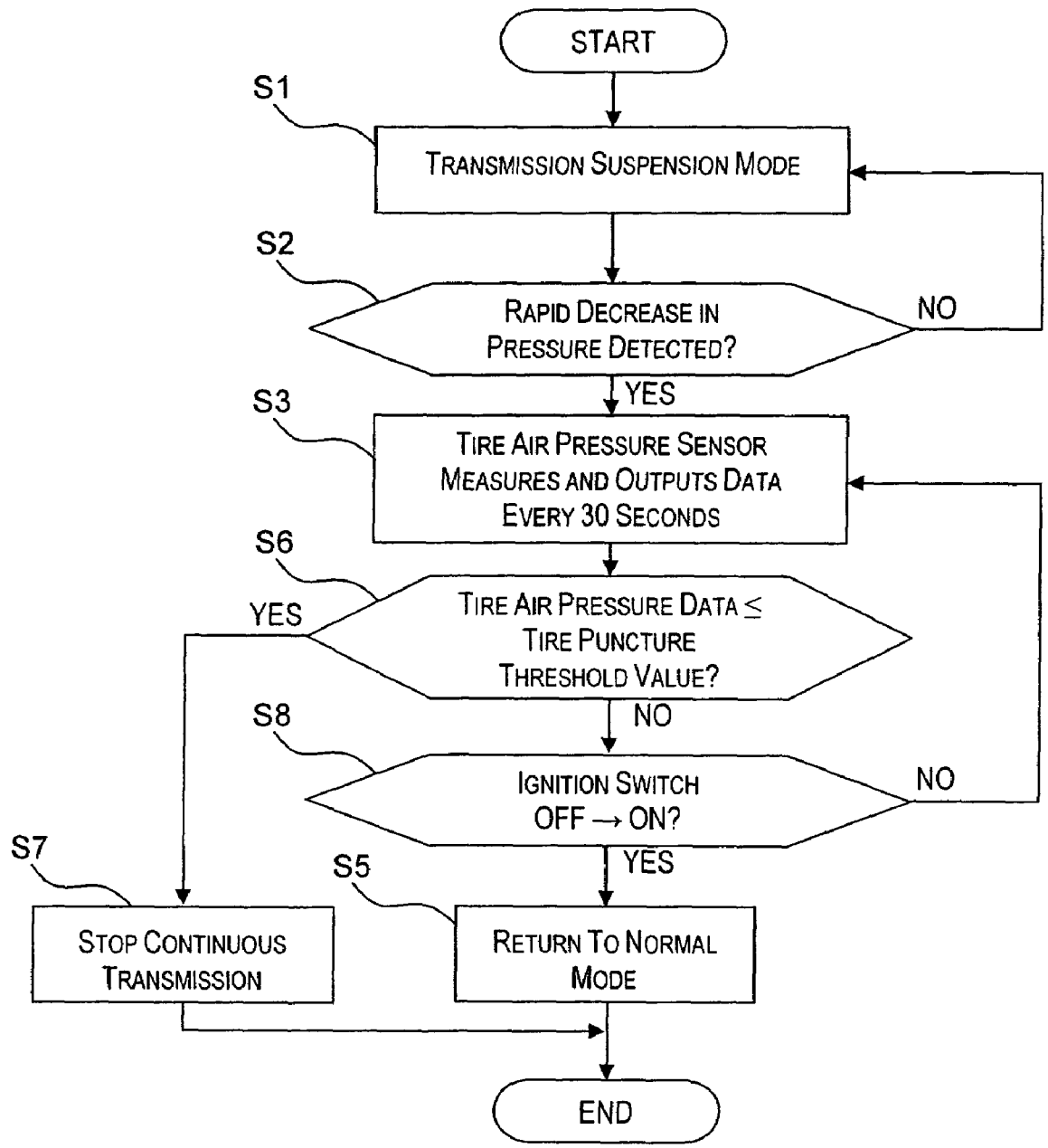
FIG. 9 is a flowchart describing a control process executed in an ASIC of the tire air pressure sensor of the tire air pressure monitoring system for executing a generally continuous transmission in accordance with the third embodiment of the present invention.

Referring now to FIGS. 8 and 9, a tire air pressure monitoring system in accordance with a third embodiment will now be explained. In view of the similarity between the first, second and third embodiments, the parts of the third embodiment that are identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity.

The tire air pressure monitoring system of the third embodiment differs from the tire air pressure monitoring system of the second embodiment in that the tire air pressure sensors 10 of the first embodiment is substituted by tire air pressure sensors 110 in the third embodiment. More specifically, the tire air pressure sensors 110 are basically identical to the tire air pressure sensors 10 except for each of the tire air pressure sensors 110 of the third embodiment is provided with a ignition status receiver 110*i* configured and arranged to receive an ON/OFF information of the ignition switch of the vehicle V as seen in FIG. 8. Moreover, in the third embodiment of the present invention, an ASIC 110*d* of the tire air pressure sensor 110 is configured to determine the generally continuous transmission termination condition based on the ON/OFF information of the ignition switch received by the ignition status receiver 110*i*. More specifically, the ASIC 110*d* is configured to determine the vehicle traveling state based on the ON/OFF information of the ignition switch received by the ignition status receiver 110*i*. Other structures are basically identical to the tire air pressure monitoring system of the first embodiment, and thus, the description of these structures is omitted for the sake of brevity.

Referring now to FIG. 9, a control process executed in the ASIC 110d of each of the tire air pressure sensors 110 to control the generally continuous transmission in accordance with the third embodiment of the present invention will be described. Steps S1, S2, S3, and S5 are basically identical to steps S1, S2, S3, and S5 shown in the flowchart of FIG. 5, and steps S6 and S7 are basically identical to steps S6 and S7 shown in the flowchart of FIG. 7. Therefore, the descriptions of these steps are omitted.

In step S8, the ASIC 110d is configured to determine whether the ignition switch of the vehicle V has been switched from OFF state to ON state based on the information received by the ignition status receiver 110i provided to the tire air pressure sensors 110. When the ASIC 110d determines the ignition status has been switched from OFF state to ON state in step S8 (Yes in step S8), the process advances to step S5. Otherwise (No in step S8), the ASIC 110d is configured to return to step S3. Thus, in the third embodiment of the present invention, the generally continuous transmission termination condition is satisfied when the ignition status receiver 110i detects the ignition status is changed from OFF state to ON state.

Operation for Completing Continuous Transmission

When the high tire air pressure (e.g., 350 kPa) is released to obtain the suitable tire air pressure (e.g., 240 kPa) after the vehicle V is arrived at the dealer in the importing country (such as a country in North America), the process in the flowchart in FIG. 8 advances from step S1 to step S2 to step S3 when the tire air pressure decreases, and the generally continuous transmission every 30 seconds is initiated. After the generally continuous transmission is initiated, the process advances from step S3 to step S6, and to step S8 as long as the tire puncture has not been occurred. In step S8, the ASIC 110d is configured to determine whether the ignition switch has been switched from OFF state to ON state based on the information received by the ignition status receiver 110i. When the ignition switch is switched from OFF state to ON state, the process advances from step S8 to step S5 in the flowchart in FIG. 8, and the generally continuous transmission mode is terminated. Then, the ASIC 110d is configured to switch to the normal mode with the regular periodic transmission.

As explained above, in order to avoid the situation in which tire air pressure alarm controller 5 falsely determines the system is not working properly, the generally continuous transmission mode for transmitting data must be continued until the receiver is in the reception-enabled state. When determining whether the receiver is capable of reception of the wireless data, each of the tire air pressure sensors 110, which represents the transmitter side, is provided with a data receiving function (the ignition status receiver 110i) in the third embodiment. Therefore, it is possible to determine that the receivers are turned on based on the state of the ignition switch. Thus, the timing for determining that the receivers are turned on is faster in the third embodiment than in the first or second embodiment.

Accordingly, with the tire air pressure monitoring system of the third embodiment, the following effects can be obtained in addition to the effects (1) through (3) of the first embodiment and the effect (4) of the second embodiment.

(5) Each of the tire air pressure sensors 110 is provided with the ignition status receiver 110i for receiving the ON/OFF information of the ignition switch of the vehicle V, and the generally continuous transmission is terminated in the generally continuous transmission processing when the ignition status receiver 110i detects that the ignition switch has been switched to ON state. Therefore, the generally continuous transmission for transmitting the necessary data every 30 seconds can be terminated with a suitable and faster timing that substantially coincides with the start of the operation ON state on the receiver side (i.e., when the receiver is turned on).

Although in the first trough third embodiments explained below, examples were given wherein the generally continuous transmission is terminated when the roll switch 10c is ON or the acceleration sensor 10b is ON (the first and second embodiments), or when the ignition switch has been switched from OFF state to ON state (the third embodiment), the tire air pressure monitoring system of the present invention can be configured and arranged to terminate the generally continuous transmission upon an initial reception by the receiver as long as the reception-enabled state of the receiver can be determined.

Also, the generally continuous transmission interval for the generally continuous transmission (e.g., one transmission in every 30 seconds) was set to be less than the prescribed transmission interval used when the vehicle is traveling (e.g., one transmission in every one minute) in the above explained embodiments. However, the generally continuous transmission interval in the present invention can be set to any length as long as the generally continuous transmission interval is shorter than the prescribed transmission interval used when the vehicle is stopped (e.g., one transmission in every one hour).

The above explained embodiments of the tire air pressure monitoring system are explained as applied in the vehicle V (a passenger vehicle) having four tires 1, 2, 3 and 4. However, the tire air pressure monitoring system of the present invention can also be applied to a smaller vehicle equipped with less than four tires (wheels), or a larger vehicle equipped with more than four tires (wheels).

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A tire air pressure monitoring system comprising:
a tire air pressure detecting device coupled to each tire of a vehicle including
a pressure detecting section configured and arranged to detect a tire air pressure,
a transmitting section configured and arranged to transmit a wireless signal indicative of at least the tire air pressure detected by the pressure detecting section, and
a transmission control section operatively coupled to the pressure detecting section and the transmitting section, and configured to selectively control transmission of the wireless signal from the transmitting section to selectively operate a rest mode, a normal mode in which the wireless signal is transmitted in at least a first prescribed interval, and a generally continuous transmission mode in which the wireless signal is transmitted in a continuous transmission interval that is shorter than the first prescribed interval; and
a tire air pressure alarm control device coupled to the vehicle including
a receiving section configured and arranged to receive the wireless signal from the transmitting section of the tire air pressure detecting device, and
an alarm control section configured to issue an alarm when the tire air pressure is equal to or less than a prescribed pressure,
the transmission control section of the tire air pressure detecting device being further configured to shift from the rest mode to the generally continuous transmission mode upon determination of decrease in the tire air pressure by an amount equal to or greater than a prescribed amount within a prescribed period of time, and to shift from the generally continuous transmission mode to the normal mode upon determination of a continuous transmission termination condition that indicates the receiving section of the tire air pressure alarm control device can receive the wireless signal.

2. The tire air pressure monitoring system as recited in claim 1, wherein
the rest mode is a transmission suspension mode in which transmission of the wireless signal is suspended.

3. The tire air pressure monitoring system as recited in claim 1, wherein
the tire air pressure detecting device further includes a traveling state detecting section configured and arranged to detect a vehicle traveling state in which the vehicle is traveling at a speed higher than a prescribed speed; and
the transmission control section of the tire air pressure detecting device is configured to determine the generally continuous transmission termination condition when the vehicle traveling state is detected in the traveling state detecting section.

4. The tire air pressure monitoring system as recited in claim 3, wherein
the traveling state detecting section of the tire air pressure detecting device includes at least one of an acceleration sensor and a roll switch that is configured and arranged to detect information relating to centrifugal force imparted thereto, and the transmission control section of the tire air pressure detecting device is configured to switch at least between the first prescribed interval and a second prescribed interval for transmitting the wireless signal based on the information detected by the at least one of the acceleration sensor and the roll switch when the vehicle is in the normal mode.

5. The tire air pressure monitoring system as recited in claim 1 wherein
the transmission control section of the tire air pressure detecting device is further configured to exit the generally continuous transmission mode upon determination of a tire puncture condition in which the tire pressure detected by the tire pressure detecting section is equal to or less than a tire puncture threshold value during the generally continuous transmission mode.

6. The tire air pressure monitoring system as recited in claim 1, wherein
the tire air pressure detecting device further includes an ignition status receiving section configured and arranged to receive an ON/OFF status of an ignition switch of the vehicle,
the transmission control section of the tire air pressure detecting device is configured to determine the generally continuous transmission termination condition when the ignition status receiving section detects the ignition switch was changed from an OFF status to an ON status.

7. The tire air pressure monitoring system as recited in claim 6 wherein
the transmission control section of the tire air pressure detecting device is further configured to exit the generally continuous transmission mode upon determination of a tire puncture condition in which the tire pressure detected by the tire pressure detecting section is equal to or less than a tire puncture threshold value during the generally continuous transmission mode.

8. The tire air pressure monitoring system as recited in claim 4, wherein
the transmission control section of the tire air pressure detecting device is further configured to select the first prescribed interval when the information relating to centrifugal force indicates the vehicle is traveling at a speed below a prescribed speed and to select the second prescribed interval that is shorter than the first prescribed interval when the information relating to the centrifugal force indicates the vehicle is traveling at a speed equal to or higher than the prescribed speed during the normal mode, the generally continuous transmission interval being shorter than the second prescribed interval.

9. The tire air pressure monitoring system as recited in claim 2, wherein
the tire air pressure detecting device further includes a traveling state detecting section configured and arranged to detect a vehicle traveling state in which the vehicle is traveling at a speed higher than a prescribed speed; and
the transmission control section of the tire air pressure detecting device is configured to determine the generally continuous transmission termination condition when the vehicle traveling state is detected in the traveling state detecting section.

10. The tire air pressure monitoring system as recited in claim 8, wherein
the traveling state detecting section of the tire air pressure detecting device includes at least one of an acceleration sensor and a roll switch that is configured and arranged to detect information relating to centrifugal force imparted thereto, and the transmission control section of the tire air pressure detecting device is configured to switch at least between the first prescribed interval and a second prescribed interval for transmitting the wireless signal based on the information detected by the at least one of the acceleration sensor and the roll switch when the vehicle is in the normal mode.

11. The tire air pressure monitoring system as recited in claim 10 wherein the transmission control section of the tire air pressure detecting device is further configured to exit the generally continuous transmission mode upon determination of a tire puncture condition in which the tire pressure detected by the tire pressure detecting section is equal to or less than a tire puncture threshold value during the generally continuous transmission mode.

12. The tire air pressure monitoring system as recited in claim 2, wherein the tire air pressure detecting device further includes an ignition status receiving section configured and arranged to receive an ON/OFF status of an ignition switch of the vehicle, the transmission control section of the tire air pressure detecting device is configured to determine the generally continuous transmission termination condition when the ignition status receiving section detects the ignition switch was changed from an OFF status to an ON status.

13. The tire air pressure monitoring system as recited in claim 12 wherein the transmission control section of the tire air pressure detecting device is further configured to exit the generally continuous transmission mode upon determination of a tire puncture condition in which the tire pressure detected by the tire pressure detecting section is equal to or less than a tire puncture threshold value during the generally continuous transmission mode.

14. The tire air pressure monitoring system as recited in claim 10, wherein the transmission control section of the tire air pressure detecting device is further configured to select the first prescribed interval when the information relating to centrifugal force indicates the vehicle is traveling at a speed below a prescribed speed and to select the second prescribed interval that is shorter than the first prescribed interval when the information relating to the centrifugal force indicates the vehicle is traveling at a speed equal to or higher than the prescribed speed during the normal mode, the generally continuous transmission interval being shorter than the second prescribed interval.

15. A tire air pressure monitoring system comprising:

pressure detecting means for detecting a tire air pressure of each tire of a vehicle;

transmitting means for wirelessly transmitting a wireless signal indicative of at least the tire air pressure detected by the pressure detecting means;

receiving means for receiving the wireless signal from the transmitting means;

transmission control means for selectively controlling transmission of the wireless signal from the transmitting means to the receiving means to selectively operate a rest mode, a normal mode in which the wireless signal is transmitted in at least a first prescribed interval, and a generally continuous transmission mode in which the wireless signal is transmitted in a continuous transmission interval that is shorter than the first prescribed interval by shifting from the rest mode to the generally continuous transmission mode upon determination of decrease in the tire air pressure by an amount equal to or greater than a prescribed amount within a prescribed period of time, and by shifting from the generally continuous transmission mode to the normal mode upon determination of a continuous transmission termination condition that indicates the receiving section of the tire air pressure alarm control device can receive the wireless signal; and alarm control means for issuing an alarm when the tire air pressure received by the receiving means is equal to or less than a prescribed pressure.

16. A method of controlling a tire air pressure monitoring system comprising:

detecting a tire air pressure of each tire of a vehicle;

transmitting a wireless signal indicative of at least the tire air pressure that was detect to a receiver;

selectively controlling transmission of the wireless signal to selectively operate a rest mode, a normal mode in which the wireless signal is transmitted in at least a first prescribed interval, and a generally continuous transmission mode in which the wireless signal is transmitted in a continuous transmission interval that is shorter than the first prescribed interval;

shifting from the rest mode to the generally continuous transmission mode upon determination of decrease in the tire air pressure by an amount equal to or greater than a prescribed amount within a prescribed period of time;

shifting from the generally continuous transmission mode to the normal mode upon determination of a continuous transmission termination condition that indicates the wireless signal can be received by the receiver; and issuing an alarm when the tire air pressure received by the receiver is equal to or less than a prescribed pressure.

* * * * *